United States Patent
Javora et al.

(10) Patent No.: US 11,651,920 B2
(45) Date of Patent: May 16, 2023

(54) CIRCUIT BREAKER POLE FOR LOW VOLTAGE OR MEDIUM VOLTAGE OPERATION

(71) Applicant: ABB Schweiz AG, Baden (CH)

(72) Inventors: Radek Javora, Hrusovany u Brna (CZ); Dietmar Gentsch, Ratingen (DE); Josef Cernohous, Jamne nad Orlici (CZ); Tomas Kozel, Brno (CZ); Kai Gorlt, Ratingen (DE)

(73) Assignee: ABB Schweiz AG, Baden (CH)

( * ) Notice: Subject to any disclaimer, the term of this patent is extended or adjusted under 35 U.S.C. 154(b) by 244 days.

(21) Appl. No.: 17/117,141

(22) Filed: Dec. 10, 2020

(65) Prior Publication Data

US 2021/0183603 A1    Jun. 17, 2021

(30) Foreign Application Priority Data

Dec. 11, 2019 (EP) .................................... 19215334

(51) Int. Cl.
*H01H 33/02* (2006.01)
*H01H 71/02* (2006.01)
*H01H 71/10* (2006.01)
*H02B 13/02* (2006.01)

(52) U.S. Cl.
CPC ........ *H01H 71/0207* (2013.01); *H01H 33/02* (2013.01); *H01H 71/1009* (2013.01); *H02B 13/02* (2013.01); *H01H 2071/1036* (2013.01)

(58) Field of Classification Search
CPC .... H01H 33/53; H01H 33/02; H01H 71/0207; H01H 71/1009; H01H 71/02–08; H01H 2071/1036; H02B 1/044; H02B 13/02
See application file for complete search history.

(56) References Cited

U.S. PATENT DOCUMENTS

2016/0197459 A1\* 7/2016 Motta ...................... H02B 3/00
29/602.1

FOREIGN PATENT DOCUMENTS

| DE | 2856187 A1 | 7/1980 |
| EP | 1983625 A1 | 10/2008 |
| EP | 3671986 A1 | 6/2020 |
| EP | 3671989 A1 | 6/2020 |
| FR | 2438360 A1 | 4/1980 |

\* cited by examiner

*Primary Examiner* — Bryan R Perez
(74) *Attorney, Agent, or Firm* — Leydig, Voit & Mayer, Ltd.

(57) ABSTRACT

A circuit breaker pole for low voltage or medium voltage operation includes: a main body section; a first end section; and a second end section. The first end section is fixedly connectable to a wall of an enclosure. The second end section is fixedly connectable to the wall of the enclosure.

8 Claims, 3 Drawing Sheets

CIRCUIT BREAKER POLE FOR LOW VOLTAGE OR MEDIUM VOLTAGE OPERATION

CROSS-REFERENCE TO PRIOR APPLICATION

Priority is claimed to European Patent Application No. EP 19 215 334.4, filed on Dec. 11, 2019, the entire disclosure of which is hereby incorporated by reference herein.

FIELD

The present invention relates to circuit breaker pole for low voltage or medium voltage operation.

BACKGROUND

Switchgear and control gear (also termed controlgear) and one or more enclosures formed usually from metal sheets of a certain thickness, which exhibit a certain amount of flexibility or lack of stiffness when enclosures formed from sheet having a large surface area. Thus, the enclosures can exhibit a degree of mechanical instability requiring additional mechanical reinforcement or supporting structures, or sheets having increased thickness. The enclosures must also be able to withstand high temperatures, that could for example occur as a consequence of a failure of one or more components, further requiring that the enclosures of the switchgear or control gear have an appropriate level of structural integrity. This all adds to the cost of the switchgear or control gear. Furthermore, problems can arise relating to alignment of mechanical parts as enclosure sizes become larger.

There is a need to address these issues.

Therefore, it would be advantageous to have an improved means of providing mechanical reinforcement or structural integrity of one or more enclosures of a low voltage or medium voltage switchgear or control gear.

SUMMARY

In an embodiment, the present invention provides a circuit breaker pole for low voltage or medium voltage operation, the circuit breaker pole comprising: a main body section; a first end section; and a second end section, wherein the first end section is configured to fixedly connect to a wall of an enclosure, and wherein the second end section is configured to fixedly connect to the wall of the enclosure.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
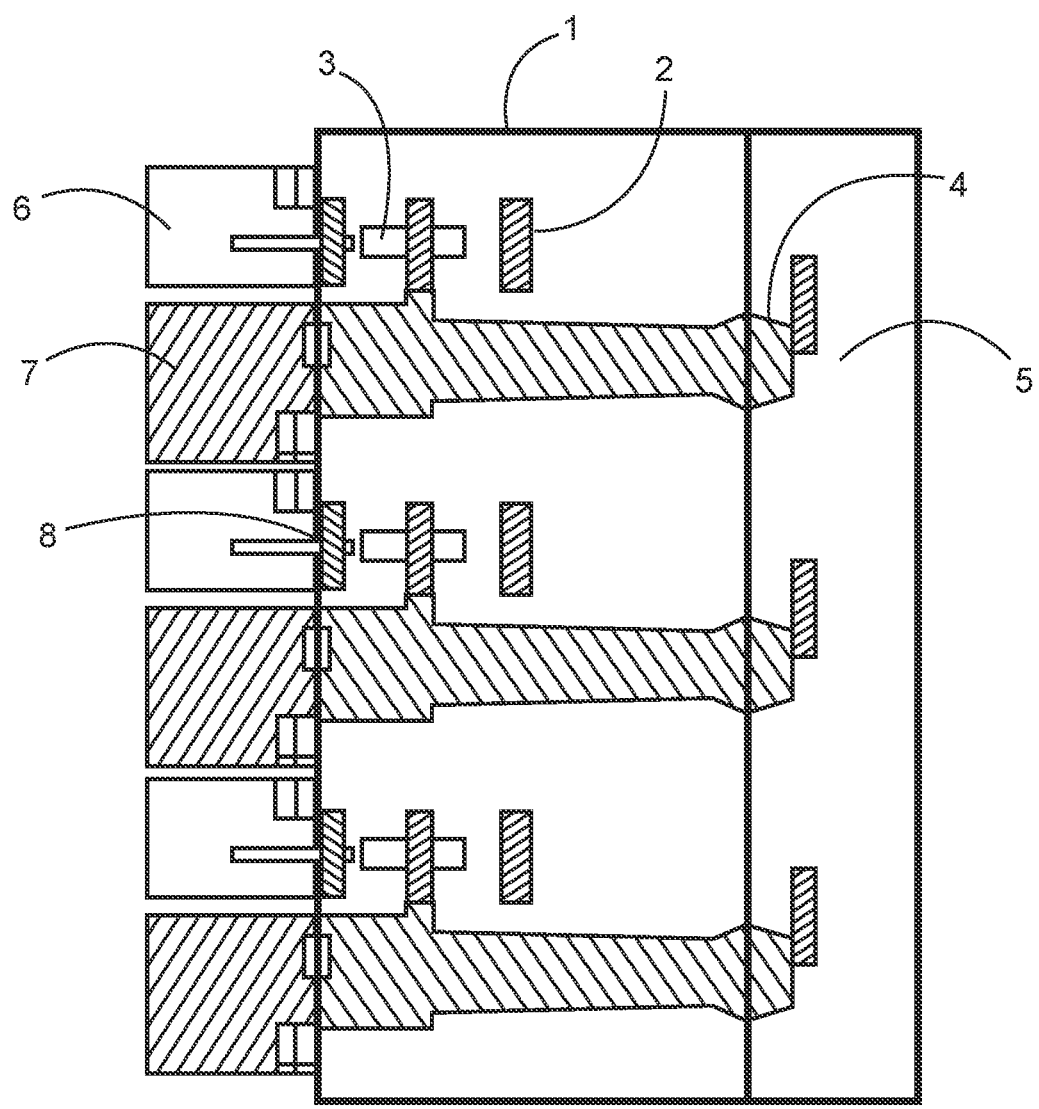
FIG. 1 shows an example of a general concept of three phase switchgear or control gear.

In a first aspect, there is provided a circuit breaker pole for low voltage or medium voltage operation. The circuit breaker pole comprises:

a main body section;
a first end section; and
a second end section.

The first end section is configured to fixedly connect to a wall of an enclosure. The second end section is configured to fixedly connect to a wall of the enclosure.

When the first end section is fixedly connected to a first wall of an enclosure and the second end section is fixedly connected to a second wall of an enclosure, the main body section extends between the first wall and second wall.

In an example, the first end section is configured to disconnect from the wall of the enclosure; and the second end section is configured to disconnect from the wall of the enclosure.

In an example, an axis of the circuit breaker pole extends from the first end section to the second end section. The first end section comprises a first portion and a second portion. A width of the first portion in a direction perpendicular to the axis is greater than a width of the second portion in the direction perpendicular to the axis.

In an example, the second portion is configured to extend through a hole in a wall of an enclosure and the first portion is configured not to extend through the hole in the wall of the enclosure.

In an example, the second portion comprises a section having at least partly circular cross-section that is threaded.

In an example, the second end section comprises a first portion and second portion, wherein a width of the first portion in a direction perpendicular to the axis is greater than a width of the second portion in the direction perpendicular to the axis.

In an example, the second portion is configured to extend through a hole in a wall of an enclosure and the first portion is configured not to extend through the hole in the wall of the enclosure.

In an example, the second portion comprises a section having at least partly circular cross-section that is threaded.

In a second aspect, there is provided a switchgear or controlgear for low voltage or medium voltage operation, comprising:

one or more enclosures; and
a circuit breaker pole according to the first aspect;
first fastening means; and
a second fastening means.

The first end section is connected to a first wall of the one or more enclosures. The second end section is connected to a second wall of the one or more enclosures. The first fastening means is connected to the first end section to fixedly connect the first end section to the first wall. The second fastening means is connected to the second end section to fixedly connect the second end section to the second wall.

In an example, the first fastening means is located on an opposite side of the first wall to the main body section of the circuit breaker pole, and the second fastening means is located on an opposite side of the second wall to the main body section of the circuit breaker pole.

In an example, the first fastening means is configured to disconnect from the first end section; and the second fastening means is configured to disconnect from the second end section.

In an example, an axis of the circuit breaker pole extends from the first end section to the second end section, and the first end section comprises a first portion and second portion. A width of the first portion in a direction perpendicular to the axis is greater than a width of the second portion in the direction perpendicular to the axis. The second end section comprises a first portion and second portion, and a width of the first portion in a direction perpendicular to the axis is greater than a width of the second portion in the direction perpendicular to the axis.

In an example, the second portion of the first end section extends through the hole in the first wall and the first portion of the first end section is configured not to extend through the hole in the first wall.

In an example, the second portion of the second end section extends through the hole in the second wall and the first portion of the second end section is configured not to extend through the hole in the second wall.

In an example, the second portion of the first end section comprises a section having at least partly circular cross-section that is threaded and the second portion of the second end section comprises a section having at least partly circular cross-section that is threaded. The first fastening means has a threaded section that makes a screwed connection with the second portion of the first end section and the second fastening means has a threaded section that makes a screwed connection with the second portion of the second end section.

In an example, the switchgear or controlgear comprises a plurality of mechanical reinforcement means and/or a plurality of supporting structure means. The circuit breaker pole forms part of the plurality of mechanical reinforcement means and/or part of the plurality of supporting structure means.

In an example, a hole in a fixation wall is configured to receive a part of the circuit breaker pole; and wherein a cross-section of the hole is non-circular The above aspects and examples will become apparent from and be elucidated with reference to the embodiments described hereinafter.

Figure 2:
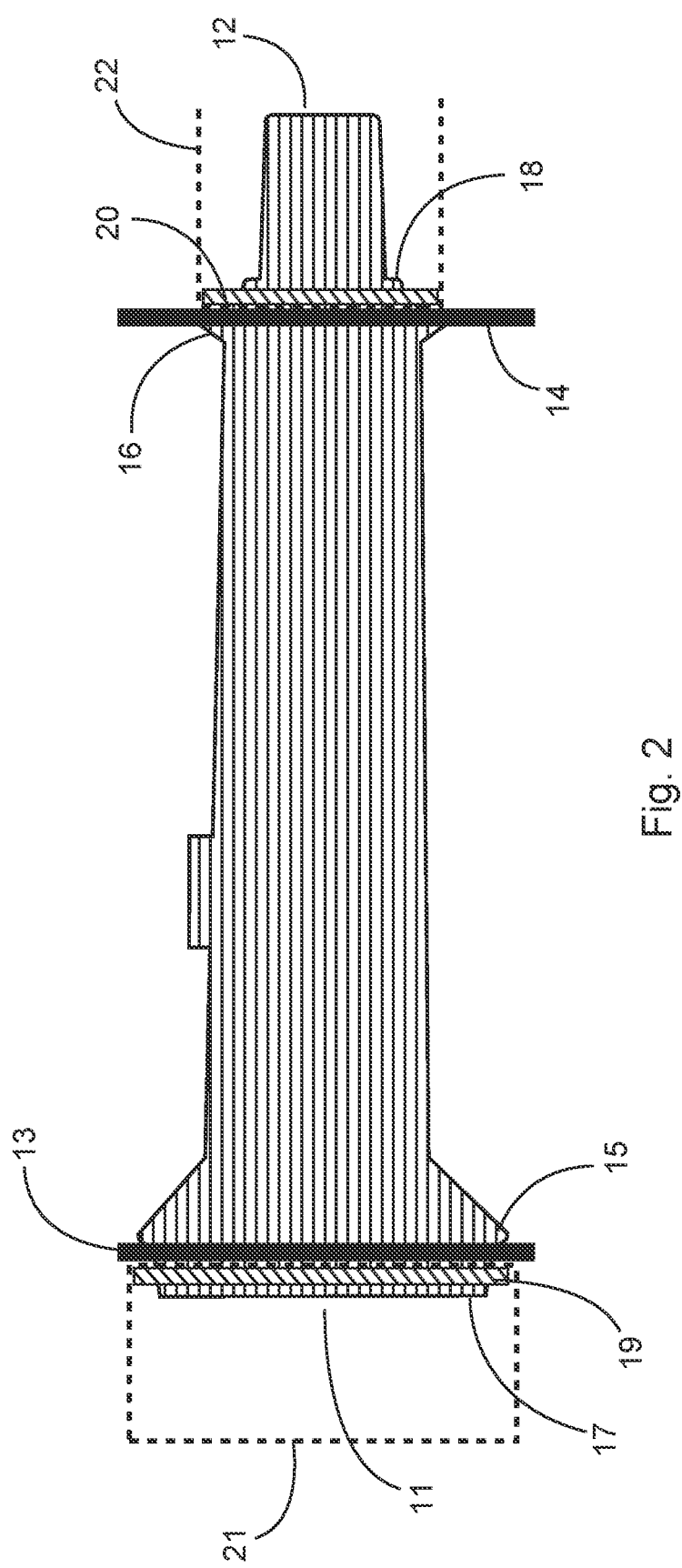
FIG. 2 shows an example of the new circuit breaker pole details.

To place the new circuit breaker pole, shown at FIG. 2, in context it is worthwhile introducing a general concept design of circuit breaker pole, as shown in FIG. 1.

FIG. 1 shows an example of a three phase switchgear or control gear.

Where:
1=Arc proof enclosure;
2=Main busbar system;
3=Three position disconnector switch;
4=Circuit breaker single pole+possible also with current and voltage sensors integrated;
5=Human operator accessible cable connection box—with removable cover and/or doors;
6=Removable module or box with disconnector drive and auxiliaries with plug and socket connection to power source and station communication bus;
7=Removable module or box with circuit breaker control electronics and auxiliaries with plug and socket connection to the circuit breaker drive and auxiliaries and with plug and socket connection to power source and station communication bus;
8=Earthing copper.

A specific example of an existing three phase switchgear or controlgear has primary circuits of different phases arranged phase by phase. In such an example all main electrical components are in one plane for straight conductive path, good accessibility and easy monitoring. This layout results in less mechanical stress on busbars in case of short circuit; less electrical stress due to distances; smaller footprint; less thermal stress (better ventilation); reduction of copper at a certain rating; reduction of connections from one panel to others (long flat copper busbar); visibility of parts.

Another specific example of an existing switchgear or control gear has parts requiring maintenance separated to replaceable modules. Here, the components are divided into two groups:

1st group (fixed parts) with components not requiring maintenance, are enclosed in combined busbar+circuit breaker compartment.

2nd group (withdrawable parts) of components which will require maintenance, are placed in withdrawable modules.

However, in such configurations the circuit breaker pole structure is not fixedly connected to wall structures in the manner to provide structural integrity to wall structures. Also, for longer sizes of the pole or larger panel sizes, it can be difficult to ensure proper alignment of mechanical parts during panel assembly, and also to ensure correct alignment of the movable parts during operation. Panel walls are usually made of metal sheets of a certain thickness, which exhibit some flexibility/no stiffness for larger surface areas. Mechanical strength will be further reduced in the situation when the temperature of panel walls increases and metal sheets thus reduce their mechanical performance.

When the panel design itself is required to provide all the mechanical integrity resulting from vibrations and forces coming from panel transportation, circuit breaker operations, temperature, arc or short circuit current forces, the panel design is required to have additional mechanical reinforcement. Such reinforcement can be realized by bigger panel wall thicknesses or additional supporting structure, which will reduce available space and cost increase, complexity and weight of panel design.

FIG. 2 relates to a circuit breaker pole for low voltage or medium voltage operation for example for low voltage or medium voltage switchgear or control gear that addresses these issues.

In an example of the circuit breaker pole for low voltage or medium voltage operation, the circuit breaker pole comprises a main body section, a first end section, and a second end section. The first end section is configured to fixedly connect to a wall of an enclosure. The second end section is configured to fixedly connect to a wall of the enclosure.

When the first end section is fixedly connected to a first wall of an enclosure and the second end section is fixedly connected to a second wall of an enclosure, the main body section extends between the first wall and second wall.

In this manner, the circuit breaker pole in being fixedly attached or connected to walls of the enclosure can form part of the mechanical reinforcement or supporting structure for the enclosure of for example a switchgear or control gear. Thus, the wall structures of the enclosure can be thinner than otherwise would be required because the circuit breaker pole itself is providing part of the mechanical integrity of the enclosure, rather than as is the case at present requiring further structural integrity support the circuit breaker pole. Accordingly, not only can wall structures of the enclosure be thinner, but some of the other supporting structures that otherwise would be required need not be utilised, because the circuit breaker pole itself is providing at least part of this required mechanical reinforcement of the enclosure.

In an example, when the first end section is fixedly connected to a first wall of an enclosure and the second end section is fixedly connected to a second wall of an enclosure, the circuit breaker pole is configured to maintain a separation between the first wall and the second wall.

In an example, when the first end section is fixedly connected to a first wall of an enclosure and the second end section is fixedly connected to a second wall of an enclosure, the circuit breaker pole is configured to provide structural integrity to the enclosure.

In an example, when the first end section is fixedly connected to a first wall of an enclosure and the second end section is fixedly connected to a second wall of an enclosure, the circuit breaker pole is configured to provide mechanical reinforcement to the enclosure.

According to an example, the first end section is configured to disconnect from the wall of the enclosure, and the second end section is configured to disconnect from the wall of the enclosure.

Thus, not only can the circuit breaker pole provide mechanical integrity to one or more enclosures of a switchgear or control gear, enabling those enclosures to be less intrinsically stiff and strong and therefore cheaper, but the circuit breaker pole itself can be removed from the enclosure in case of failure or other replacement. Indeed, by providing the mechanical integrity of enclosure walls that can be thin, when the circuit breaker pole is fixedly connected to the walls the opposing walls the structure as a whole becomes very strong and rigid and the walls cannot move with respect to one another. However, because the first in section and second in section can be disconnected from the walls, the circuit breaker pole can be removed. Furthermore, because now the walls of the enclosure can be intrinsically more flexible either because the material such as metal is thinner or other supporting structures are not required, when the circuit breaker pole is not fixedly connected to the walls, the walls can be flexed away from the circuit breaker pole enabling the circuit breaker point to be removed. At this stage, the enclosure of the switchgear or control gear may not have the required structural integrity. However, when a replacement circuit breaker pole is then fixedly reconnected to the walls of the enclosure, where the previous circuit breaker pole was located the structural integrity of the enclosure returns to the required level because the circuit breaker pole is providing part of the mechanical reinforcement or supporting structure for the enclosure walls or frame.

According to an example, an axis of the circuit breaker pole extends from the first end section to the second end section, and the first end section comprises a first portion and a second portion. A width of the first portion in a direction perpendicular to the axis is greater than a width of the second portion in the direction perpendicular to the axis.

According to an example, the second portion is configured to extend through a hole in a wall of an enclosure and the first portion is configured not to extend through the hole in the wall of the enclosure.

According to an example, the second portion comprises a section having at least partly circular cross-section that is threaded.

Figure 3:
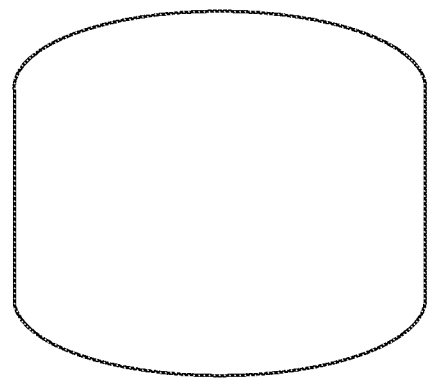
FIG. 3 shows an example of a hole geometry in a fixation wall

FIG. 3 shows example of the hole in the fixation wall as well as the respective cross-section of the second portion of the pole, preventing rotation of the pole and thus ensuring propper placement of the pole within switchgear enclosure. By not having an entirely circular cross-section (i.e. non-circular cross-section) is that during tightening the fixation means, the pole could otherwise rotate, which makes it difficult to tighten during assembly process. Therefore, a small flat part in the fixation wall has been introduced, that would prevent rotation of the pole during tightening process.

In an example, the first portion is configured not to extend through a hole in the wall of the enclosure, and the second portion is an internal threaded portion of the first end section.

According to an example, the second end section comprises a first portion and second portion, wherein a width of the first portion in a direction perpendicular to the axis is greater than a width of the second portion in the direction perpendicular to the axis.

According to an example, the second portion is configured to extend through a hole in a wall of an enclosure and the first portion is configured not to extend through the hole in the wall of the enclosure.

According to an example, the second portion comprises a section having at least partly circular cross-section that is threaded.

In an example, the first portion is configured not to extend through a hole in the wall of the enclosure, and the second portion is an internal threaded portion of the second end section.

It is clear that the circuit breaker can be utilized with a switchgear or control gear. Thus, an example relates to a switchgear or controlgear for low voltage or medium voltage operation. The switchgear or control gear comprises one or more enclosures, and a circuit breaker pole as described above with respect to FIG. 2. The switchgear or control gear also comprises first fastening means, and a second fastening means. The first end section of the circuit breaker pole is connected to a first wall of the one or more enclosures. The second end section of the circuit breaker pole is connected to a second wall of the one or more enclosures. The first fastening means is connected to the first end section to fixedly connect the first end section to the first wall. The second fastening means is connected to the second end section to fixedly connect the second end section to the second wall.

In an example, the first and second wall are walls of the same enclosure of the switchgear or controlgear.

In an example, the first and second walls are walls of different enclosures of the switchgear or controlgear.

In an example, the first and second walls are outer walls of the switchgear or controlgear.

In an example, the first wall and second walls are internal walls of the switchgear or controlgear.

In an example, the first wall is an outer wall of the switchgear or controlgear and the second wall is an internal wall of the switchgear or controlgear.

The main body section of the circuit breaker pole then extends between the first wall and second wall, and these walls can be outer or inner walls of the switchgear and there can be intermediate walls between the first wall and the second wall. Thus, for example the main body of the circuit breaker pole can extend through an inner wall of an enclosure of the switchgear or control gear.

According to an example, the first fastening means is located on an opposite side of the first wall to the main body section of the circuit breaker pole, and the second fastening means is located on an opposite side of the second wall to the main body section of the circuit breaker pole.

According to an example, the first fastening means is configured to disconnect from the first end section, and the second fastening means is configured to disconnect from the second end section.

According to an example, an axis of the circuit breaker pole extends from the first end section to the second end section, and the first end section comprises a first portion and second portion. A width of the first portion in a direction perpendicular to the axis is greater than a width of the second portion in the direction perpendicular to the axis. Also, the second end section comprises a first portion and second portion, and a width of the first portion in a direction perpendicular to the axis is greater than a width of the second portion in the direction perpendicular to the axis.

According to an example, the second portion of the first end section extends through the hole in the first wall and the first portion of the first end section is configured not to extend through the hole in the first wall. Also, the second portion of the second end section extends through the hole in the second wall and the first portion of the second end section is configured not to extend through the hole in the second wall.

According to an example, the second portion of the first end section comprises a section having at least partly circular cross-section that is threaded and the second portion of the second end section comprises a section having at least partly circular cross-section that is threaded. The first fastening means has a threaded section that makes a screwed connection with the second portion of the first end section and the second fastening means has a threaded section that makes a screwed connection with the second portion of the second end section.

In other words, the first and second fastening means can comprise nuts, with washers if required, that screw onto threaded shafts of the circuit breaker pole that protrude through walls of the enclosure in order to securely attach the circuit breaker pole to the walls, thereby provided structural integrity to the enclosure and to the switchgear or control gear.

In an example, the first portion of the first end section is configured not to extend through the hole in the first wall of the enclosure, and the second portion of the first section is an internal threaded portion of the first end section.

In other words, the first and second fastening means can comprise bolts, with washers if required, that screw into internal threaded parts of the ends of the circuit breaker pole. The bolt head then sits on one side of a wall and the bolt shaft screws into the end of the circuit breaker pole on the other side of the wall to securely attach the circuit breaker pole to the walls, thereby provided structural integrity to the enclosure and to the switchgear or control gear.

According to an example, the switchgear or controlgear comprises a plurality of mechanical reinforcement means and/or a plurality of supporting structure means. The circuit breaker pole then forms part of the plurality of mechanical reinforcement means and/or part of the plurality of supporting structure means. Thus, the enclosure structure without the circuit breaker pole can be more flexible, lighter, less rigid and overall have less mechanical structural integrity than would otherwise be required.

Continuing with FIG. 2, the new specific design of circuit breaker pole, also serves as a mechanical reinforcement or supporting structure for panel/switchgear walls or frame of a switchgear or control gear. The pole is designed in a way that both ends are equipped with an outer or inner thread, to which an additional nut or bolt can be screwed and the panel wall is fixed in between. The pole can then be fixed to rear walls of a combined circuit breaker and busbar compartment, ensuring proper alignment and distances between mentioned walls as well as providing structural integrity to the walls enabling them to be less intrinsically strong and requiring less additional supporting structures.

Thus, as shown in FIG. 2 a new design of a single interruption unit (SIU) or circuit breaker pole is provided in such a way, that it provides additional mechanical strength to the whole panel, so panel walls or panel frames do not need to be designed to withstand all possible mechanical forces alone.

Referring to FIG. 2, the SIU 4 is long enough to penetrate all panel compartments, coming from the front side 11 to the cable side 12. It penetrates a switchgear/panel wall on each side. To strengthen the panel construction and to fix to the front 13 and rear 14 walls of the panel (or switchgear or control gear), the SIU 4 has:

Built-in flange shapes 15 and 16 of the SIU are used to secure to the front and rear panel walls and to stop these walls from moving towards each other, and when fixed to the walls to stop then moving away from each other Areas or parts 17 and 18 of the SIU penetrate or extend through the walls 13 and 14 with smaller diameters than the flanges 15 and 16 and with a built-in external thread on the outer surfaces To connect the SIU 4 to the panel walls 13 and 14 as well as to strengthen the complete panel structure, the SIU is fixed to the panel by additional nuts 19 and 20. Nuts 19 and 20 and flanges 15 and 16 are then tightly holding the panel walls 13 and 14 in a mechanically strong manner, thus strengthening the overall assembly. Nuts are basically working as a flange, but from the other side of panel walls. Having two "flange-like" structures from both sides significantly reinforces the mechanical stiffness of the panel, especially along the front to back axis.

The nuts 19 and 20 can be made of thermoplastic or thermoset material and they will, apart from mechanical improvement, further improve dielectric strength towards medium-voltage parts and introduce no additional screws and dowels.

Another fixation possibility can be realized by using threaded inserts built into the flanges 15 and 16 with corresponding holes in the panel walls 13 and 14, with bolts them penetrating through the walls and being fixed to the ends of the SIU or circuit breaker pole. However, this deign may not be optimum as it results in extensive screwing and a lot of necessary parts to be introduced in the pole as well as during panel assembly, which could be more time consuming. This option is possible, but less preferred, as it may not fix the panel walls as securely as the above described design with a single nut on each side and it may also decrease the dielectric strength for medium-voltage connections on the cable side 12.

Nuts 19 and/or 20 can also have additional external or internal threads on its surface to provide a possibility to fix/screw additional parts on top. These parts can alternatively be screwed also to the remaining thread of the pole parts 17 and 18. Such additional parts can for example be a cover 21 of the pole drive at the front side 11 (to protect the pole drive from dust, humidity or accidental access) and/or a cover 22 around the bushing in the cable compartment 12 (to improve dielectric field strength/distribution around that area).

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A switchgear or controlgear for low voltage or medium voltage operation, comprising:
   one or more enclosures;
   a first fastening means;
   a second fastening means; and
   a circuit breaker pole comprising:
      a main body section;
      a first end section; and
      a second end section,
      wherein the first end section is configured to fixedly connect to a wall of an enclosure, and
   wherein the second end section is configured to fixedly connect to the wall of the enclosure;
   wherein the first end section is connected to a first wall of the one or more enclosures,
   wherein the second end section is connected to a second wall of the one or more enclosures,
   wherein the first fastening means is connected to the first end section to fixedly connect the first end section to the first wall, and
   wherein the second fastening means is connected to the second end section to fixedly connect the second end section to the second wall,
   wherein an axis of the circuit breaker pole extends from the first end section to the second end section,
   wherein the first end section comprises a first portion and a second portion,
   wherein a width of the first portion in a direction perpendicular to the axis is greater than a width of the second portion in the direction perpendicular to the axis,
   wherein the second end section comprises a third portion and fourth portion, and
   wherein a width of the third portion in the direction perpendicular to the axis is greater than a width of the fourth portion in the direction perpendicular to the axis,
   wherein the second portion of the first end section comprises a section having at least partly circular cross-section that is threaded and the fourth portion of the second end section comprises a section having at least partly circular cross-section that is threaded,
   wherein the first fastening means has a threaded section configured to make a screwed connection with the second portion of the first end section, and
   wherein the second fastening means has a threaded section configured to make a screwed connection with the fourth portion of the second end section.

2. The switchgear or controlgear according to claim 1, wherein the first fastening means is located on an opposite side of the first wall to the main body section of the circuit breaker pole, and
   wherein the second fastening means is located on an opposite side of the second wall to the main body section of the circuit breaker pole.

3. The switchgear or controlgear according to claim 1, wherein the first fastening means is configured to disconnect from the first end section, and
   wherein the second fastening means is configured to disconnect from the second end section.

4. The switchgear or controlgear according to claim 1, wherein the second portion of the first end section extends through the hole in the first wall and the first portion of the first end section is configured not to extend through the hole in the first wall, and
   wherein the fourth portion of the second end section extends through the hole in the second wall and the third portion of the second end section is configured not to extend through the hole in the second wall.

5. The switchgear or controlgear according to claim 1, wherein the switchgear or controlgear comprises a plurality of mechanical reinforcement means and/or a plurality of supporting structure means, and
   wherein the circuit breaker pole forms part of the plurality of mechanical reinforcement means and/or part of the plurality of supporting structure means.

6. The switchgear or controlgear according to claim 1, wherein a hole in a fixation wall of the switchgear or controlgear is configured to receive a part of the circuit breaker pole, and
   wherein a cross-section of the hole is non-circular.

7. The circuit breaker pole according to claim 1, wherein the first end section is configured to disconnect from the wall of the enclosure, and
   wherein the second end section is configured to disconnect from the wall of the enclosure.

8. The circuit breaker pole according to claim 1, wherein the second portion is configured to extend through a hole in the wall of the enclosure and the first portion is configured not to extend through the hole in the wall of the enclosure.

* * * * *